March 12, 1957
C. R. STRUCK
2,784,594
FLUID SAMPLING DEVICE
Filed Jan. 26, 1956
2 Sheets-Sheet 1
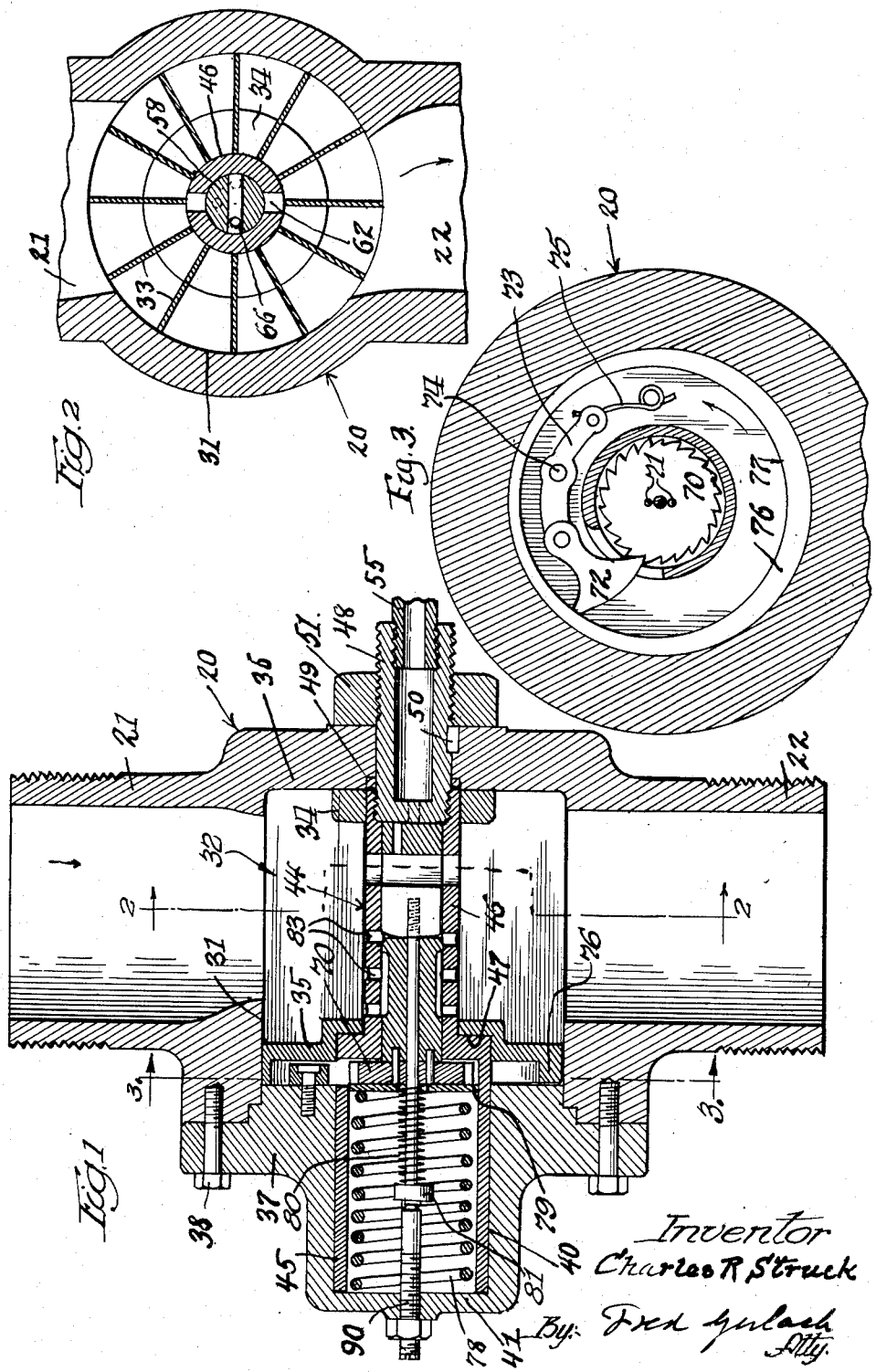
Inventor
Charles R. Struck
By: Fred Gulach
Atty.

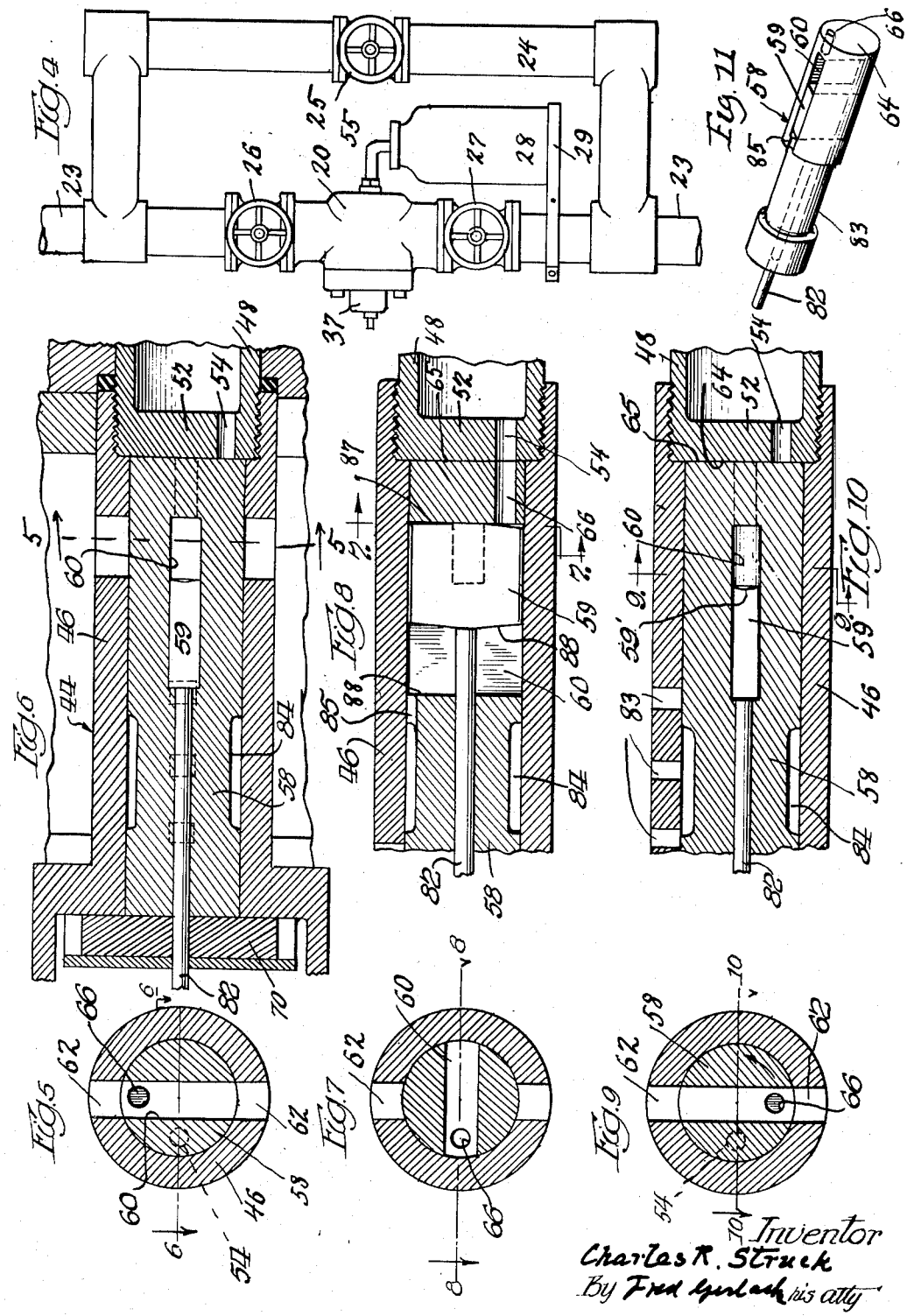

2,784,594
FLUID SAMPLING DEVICE
Charles R. Struck, Santa Barbara, Calif.

Application January 26, 1956, Serial No. 561,488

12 Claims. (Cl. 73—422)

The invention relates to devices for separating small representative quantities or samples from a flow-line of fluid.

One object of the invention is to provide an improved sampling device whereby measured samples may be separated from the flow-line.

Another object of the invention is to provide an efficient sampling device whereby accurately measured quantities of fluid are separated from the flow-line, trapped and discharged into a receptacle.

Another object of the invention is to provide a sampling device which is simple in construction and efficient in operation.

Other objects will appear from the detail description.

The invention consists in the several novel features hereinafter described and more particularly defined by claims at the conclusion hereof.

In the drawings:

Fig. 1 is a vertical section of a sampling device embodying the invention;

Fig. 2 is a section taken on line 2—2 of Fig. 1, the carrier being rotated to discharging position;

Fig. 3 is a section taken on line 3—3 of Fig. 1;

Fig. 4 is a side elevation of the sampling device and its connections with a flow-line for the fluid;

Fig. 5 is a section taken on line 5—5 of Fig. 6, the carrier being shown in position to receive a sample of fluid;

Fig. 6 is a section taken on line 6—6 of Fig. 5;

Fig. 7 is a section taken on line 7—7 of Fig. 8, the expeller-plunger being shown after discharge of a sample of fluid;

Fig. 8 is a section taken on line 8—8 of Fig. 7;

Fig. 9 is a section taken on line 9—9 of Fig. 10, the carrier being shown in position after discharge of a sample of fluid;

Fig. 10 is a section taken on line 10—10 of Fig. 9; and

Fig. 11 is a perspective view of the rotatable carrier and the plunger slidable therein.

The invention is exemplified in a sampling device which comprises a casing 20 provided with an inlet leg 21 and an outlet leg 22 which are opposite to each other and are communicatively included in a pipe 23 or flow-line through which the fluid to be sampled flows under pressure. Valves 26 and 27 control the flow through casing 20 for sampling operations. A pipe 24 controlled by a valve 25 is adapted to by-pass the flow of fluid around the sampling device when valves 26 and 27 are closed. A receptacle 28 is removably supported on a bracket 29 for collecting the samples from casing 20.

The casing 20 is provided with a transverse bore 31 in which a propeller-wheel generally designated 32 is rotatable by the fluid under pressure in transit from inlet leg 21 to outlet leg 22. Wheel 32 comprises an annular series of radial vanes 33 which fit in bore 31, an integral annulus or hub 34 at one of its ends, and an integral hub or side 35 at its opposite end. One end of bore 31 is closed by an integral wall 36 of the casing and its opposite end is closed by a head 37 which is removably secured by screws 38 on the contiguous side of casing 20. Head 37 is provided with a cylindrical bore 40, the outer end of which is closed by an end-wall 41. The inner end of bore 40 in head 37 extends to the bore 31 for the propeller 32. The hubs 34 and 35 of propeller 32 are journalled on a sleeve which is generally designated 44 and stationary in casing 20. The sleeve 44 comprises a cylindrical member 45 fitting and supported in the bore 40 in head 37, an integral tubular member 46 of smaller diameter which extends axially through the propeller and across the bore 31 in which the propeller rotates, and an annular shoulder 47 between said members. Hub 35 of propeller 32 is journalled on the sleeve-member 45 adjacent shoulder 47 and the hub 35 of the propeller is journalled on the end of member 46 which terminates at the inner face of the wall 36 of the casing. Sleeve 46 is secured by a screw-thread to the inner end of a tubular bushing or discharge-fitting 48. The end of sleeve-member 46 at bushing 48 engages a sealing-ring 49 which is confined in a groove in wall 36. Bushing 48 extends through wall 36 and is fixed against rotation in the casing by a key 50. A nut 51 clamps the adjacent end of sleeve-member 46 against sealing ring 49 and secures sleeve 44 in the casing 20 and on bushing 48. Bushing 48 has a wall 52 at its inner end which is provided with an off-center port 54. A tube 55 is connected to deliver samples of fluid from bushing 48 into receptacle 28.

The invention comprises means for intermittently separating a small measured quantity of fluid from the flow through casing 20 around sleeve-member 46 of sleeve 44, trapping the separated quantity or sample and then expelling the trapped sample into bushing 48 for delivery into the collecting receptacle 28. This means comprises a carrier generally designated 58, having a cylindrical periphery journalled in the bore of sleeve 44, and a plunger 59 which is rotatable with the carrier and slidable in a diametrical slot 60 in the carrier for expelling the trapped samples from the carrier into the bushing 48. The carrier 58 and plunger 59 are conjointly rotatable by fluid under pressure passing around sleeve 44 and across bore 31 and impacts vanes 33 of propeller 32. Fluid from the flow surrounding sleeve 44 is also utilized to impart strokes to the plunger 59 for expelling trapped samples from slot 60 into the bushing 48.

Mechanism for rotating carrier 58 with the plunger 59 therein from propeller 32, comprises a ratchet wheel 70 which is secured by studs 71 to carrier 58, a pawl 72 pivoted on a lever 73 which is pivoted at 74 on the inner face of stationary head 37, a spring 75 which retracts said lever and a flange 76 having an internal eccentric cam-surface 77 for shifting pawl 72 to rotate ratchet-wheel 70 one step during each rotation of the propeller 32. Rotation of the carrier controls the separation of a measured quantity of fluid from the flow through casing 20, traps the separated fluid as a sample in the carrier, and controls the discharge of the sample into the outlet bushing 48. The open sides of slot 60, as the carrier is rotated, registers with a pair of ports 62 in the stationary sleeve-member 46 to conduct surrounding fluid into the slot 60. During the continuing rotation, the ends of slot 60 are closed by the sleeve-member 46 and the samples of fluid are trapped in the carrier and then released for discharge into the outlet fitting. The carrier extends axially through sleeve-member 46 to bushing 48 and has an end-face 64 which fits the inner end-face 65 on bushing 48. Slot 60 has an end-face 87 adjacent the bushing 48 and an end-face 88 at its opposite end. The slot 60 between said end-faces forms a chamber in one end of which the fluid is trapped and in which plunger 59 is slidable to expel a sample from the carrier.

Rotation of the carrier also controls the discharge of trapped fluid from slot 60 by means of an off-center port 66 which extends between end-face 64 and slot 60, and a port 54 in the wall 52 of bushing 48 with which the port 66 is adapted to register during a cycle of the rotation of the carrier. A coil spring 78 between wall 41 of head 37 and a plate 79 exerts endwise pressure on the carrier 58 for holding end-face 64 of the carrier in tight fitting relation with the abutting face 65 on bushing 48. Rotation of the carrier in sleeve-member 46 also controls the operation of plunger 59 to discharge the trapped samples of fluid from the carrier. The plunger is slidable to expel a sample from slot 60 in the carrier by an excess of fluid pressure between end-face 88 of slot 60 and the contiguous end-face of plunger 59. Sleeve-member 46 is provided with ports 83 through which fluid under pressure can flow constantly to an annular channel 84 and a groove 85 to the slot 60 at its end-face 88 for exerting endwise pressure on the plunger 59 and imparting an expelling stroke thereto. When fluid is trapped in the slot 60 of the carrier, the pressure on the ends of the plunger 59 is about equalized. A spring 80 around a stem 82 on the plunger 59 between a head 81 is adapted to retract the plunger when the fluid pressure on the ends of the plunger is substantially balanced.

A stop-screw 90 in the end-wall 41 of head 37 is adapted to engage head 81 and arrest the retraction of stem 82 and plunger 59. By adjusting screw 90 the length of the retractile stroke of plunger 59 may be varied to increase or decrease the volume of the samples conducted into the carrier and expelled by the plunger.

The end-face of plunger 59 at its discharge end has a slight wedge formation as at 59 (Fig. 10) so that fluid from ports 62 will pass between end-face 87 of slot 60 and the plunger when the plunger is to be retracted by spring 80.

The operation will be as follows: Assuming the sampling device to be installed in a fluid-pressure line as illustrated in Fig. 4, valve 25 closed, and valves 26 and 27 open, fluid under pressure will flow from pipe 23 through inlet leg 21 of casing 20 and exert pressure on the vanes 33 and rotate the propeller 32 around the stationary sleeve 44 on which the propeller is journalled and pass through outlet leg 22 to the pipe 23. The propeller will rotate continuously during the flow of fluid through the casing 20. Fluid under pressure between the inner ends of the vanes and surrounding the periphery of sleeve-member 46 will pass through ports 62 and 83 to the periphery of the carrier. The eccentric-cam 77 rotates with the propeller. During each revolution of the propeller, cam 77 operates pawl 72 to rotate ratchet-wheel 70, carrier 58 and plunger 59 one step, or at a greatly reduced speed relatively to the propeller. For example, the carrier is rotated one revolution during revolutions of the propeller equal in number to the teeth on ratchet-wheel 70 or for a rotative cycle of the carrier and plunger to separate a sample of the fluid. In each cycle of carrier 58 and plunger 59, the diametrical chamber or slot 60 will register with ports 62 in sleeve-member 46, as shown in Fig. 5, and fluid will flow between the end 87 of slot 60 and the contiguous end of plunger 59 while the opposite end of the plunger is subjected to substantially equal pressure from ports 83. Spring 80 will then be effective to retract the plunger 59 as shown in Fig. 1, so that the area between the plunger and end-face 87 of slot 60 will be loaded with fluid. The carrier in continued rotation from the position shown in Fig. 5 will first close ports 62 in sleeve-member 46 and trap the measured sample separated from the flow through casing 20 until port 66 in the carrier registers with port 54 in wall 52 of bushing 48. The trapped fluid will then be released to flow from the carrier through ports 66 and 54 into the bushing 48 thus relieving the pressure in the discharge end of slot 60 in the carrier and causing unilateral end pressure on the plunger 59 by fluid from ports 83 to impart an expelling stroke to the plunger for discharging the sample from the slot 60 in the carrier into the bushing 48. In continuing rotation of the carrier, its port 66 will move out of registry with and close port 66 while the plunger remains in its discharging position by reason of the unilateral endwise pressure thereon by fluid from ports 83. When the carrier in its continuing rotation has rotated 180° and reaches the position shown in Fig. 9, fluid will pass from ports 62 between end-face 87 of slot 60 and the plunger and subject the discharge end of the plunger to fluid pressure substantially equal to the fluid pressure on its opposite end. The spring 80 will then be effective to retract the plunger which will remain retracted because port 66 is out of registry with port 54 until the slot 60 again registers with the ports 62 in the position shown in Fig. 5. The pipe line flow of liquid will then replace the fluid in the carrier for the initiation of another cycle. In this manner a metered small quantity of the fluid passing through casing 20 will be separated from the stream therein, trapped in the carrier and then expelled into the receptacle 28 during each revolution of ratchet-wheel 70 which is rotated step-by-step for a single revolution during multiple revolutions of the propeller 32. During this operation, spring 78 holds the contiguous faces of the member 58 and bushing 48 in closely fitting relation. The quantity of each sample expelled may be varied by the setting of set-screw 90 to shorten or vary the retractile stroke of plunger 59.

The invention is not to be understood as restricted to the details set forth since these may be modified within the scope of the appended claims without departing from the spirit and scope of the invention.

Having thus described the invention what I claim as new and desire to secure by Letters Patent is:

1. A sampling device for fluid under pressure in a flow line, comprising: a casing provided with an inlet and an outlet for fluid; a propeller rotatable by fluid in transit through the casing; a sleeve non-rotatably mounted in the case and around which the propeller rotates; an outlet-bushing fixed in the casing for receiving samples of the fluid from the casing; a carrier rotatable and fitting in the sleeve, provided with a chamber therein; means for rotating the carrier at a reduced speed from the propeller; means controlled by the rotation of the carrier for conducting fluid from the chamber to the outlet fitting, the carrier and sleeve being provided with coacting means responsive to the rotation of the carrier for successively admitting a sample into and trapping the sample in said chamber; a plunger in the carrier for expelling the sample from the chamber into the outlet fitting, and means for imparting expelling strokes to the plunger.

2. A sampling device for fluid under pressure in a flow line, comprising: a casing provided with an inlet and an outlet for fluid, a propeller rotatable by fluid in transit through the casing; a sleeve non-rotatively mounted in the case and around which the propeller rotates, and provided with diametrically opposite ports; an outlet-fitting for receiving samples of the fluid from the casing; a carrier rotatable and fitting in the sleeve, and provided with a diametric chamber therein; means for rotating the carrier at a reduced speed from the propeller; means controlled by the carrier for conducting fluid from the chamber to the outlet fitting, the carrier having means coacting with said ports responsive to the rotation of the carrier for successively admitting a sample into and trapping the sample in said chamber; a plunger fitting in the chamber in the carrier, and means operable by fluid for imparting expelling strokes to the plunger.

3. A sampling device for fluid under pressure in a flow line, comprising: a casing provided with an inlet and an outlet for fluid; a propeller rotatable by fluid in transit through the casing; a sleeve non-rotatably mounted in the case and around which the propeller rotates; an outlet-fitting for receiving samples of the fluid from the casing; a cylindrical carrier rotatable and fitting in the sleeve, provided with a diametric slot forming a chamber therein; means for rotating the carrier at a reduced speed from the propeller; means controlled by the rotation of the carrier for conducting fluid from the chamber to the outlet-fitting, the carrier and sleeve being provided with coacting means responsive to the rotation of the carrier, for successively admitting a sample into and trapping the sample in said chamber; a plunger slidably fitting the slot in the carrier for expelling the sample from the chamber into the outlet-fitting, and fluid operable means for imparting expelling strokes to the plunger.

4. A sampling device for fluid under pressure in a flow line, comprising: a casing provided with an inlet and an outlet for fluid; a propeller rotatable by fluid in transit through the casing; a sleeve non-rotatively mounted in the case and around which the propeller rotates; an outlet-fitting for receiving samples of the fluid from the casing; a carrier rotatable and fitting in the sleeve, and provided with a chamber therein, means for rotating the carrier at a reduced speed from the propeller; means controlled by the rotation of the carrier for conducting fluid from the chamber to the outlet-fitting, the carrier and sleeve being provided with coacting means responsive to the rotation of the carrier for successively admitting a sample into and trapping the sample in said chamber; a plunger slidable in the chamber in the carrier for expelling the sample from the chamber into the outlet-fitting, means responsive to fluid under pressure for slidably shifting the plunger, and spring means for retracting the plunger.

5. A sampling device for fluid under pressure in a flow line, comprising: a casing provided with an inlet and an outlet for fluid; a propeller rotatable by fluid in transit through the casing; a sleeve non-rotatively mounted in the case and around which the propeller rotates; an outlet-fitting for receiving samples of the fluid from the casing; a carrier rotatable and fitting in the sleeve and having its end-face engaging a face on the outlet-fitting, provided with a chamber therein; spring-means for urging the carrier into engagement with the outlet-fitting; means for rotating the carrier at a reduced speed from the propeller; the carrier and sleeve being provided with coacting means responsive to the rotation of the carrier, for successively admitting a sample into and trapping the sample in said chamber; means in the engaging faces of the carrier and the outlet-fitting for conducting the sample from said chamber; a plunger slidable in the chamber in the carrier, for expelling the sample from the chamber into the outlet fitting; and fluid pressure means for imparting expelling strokes to the plunger.

6. A sampling device for fluid under pressure in a flow line, comprising: a casing provided with an inlet and an outlet for fluid; a propeller rotatable by fluid in transit through the casing; a sleeve non-rotatably mounted in the case and around which the propeller rotates; an outlet-bushing fixed in the casing for receiving samples of the fluid from the casing; a carrier rotatable and fitting in the sleeve, provided with a chamber therein: means for rotating the carrier at a reduced speed from the propeller; means controlled by the rotation of the carrier for conducting fluid from the chamber to the outlet fitting, the carrier and sleeve being provided with coacting means responsive to the rotation of the carrier for successively admitting a sample into and trapping the sample in said chamber; a plunger in the carrier for expelling the sample from the chamber into the outlet fitting; means for imparting expelling strokes to the plunger; and means for adjusting the stroke of the plunger and varying the quantity of the sample trapped in the chamber.

7. A sampling device for fluid under pressure in a flow line, comprising: a casing provided with an inlet and an outlet for fluid; a propeller rotatable by fluid in transit through the casing; a sleeve non-rotatively mounted in the case, on which the propeller is journalled, provided with diametrically opposite ports; an outlet-bushing for receiving samples of the fluid from the casing and to which the sleeve is coaxially secured; a cylindrical carrier rotatable and fitting in the bore of the sleeve, provided with a diametric slot forming a longitudinal chamber in the carrier; means for rotating the carrier at a reduced speed from the propeller; means responsive to the rotation of the carrier for controlling flow of the fluid fom the chamber to the outlet fitting; the slot in the carrier and the ports in the sleeve coacting responsively to the rotation of the carrier for successively admitting a sample into and trapping the sample in said chamber; a plunger slidable in the slot and rotatable with the carrier; and fluid pressure means for imparting expelling strokes to the plunger.

8. A sampling device for fluid under pressure in a flow line, comprising: a casing provided with an inlet and an outlet for fluid; a propeller rotatable by fluid in transit through the casing; a sleeve non-rotatably mounted in the case, on which the propeller is journalled, provided with diametrically opposite ports; an outlet-bushing for receiving samples of the fluid from the casing and to which the sleeve is coaxially secured; a cylindrical carrier rotatable and fitting in the bore of the sleeve, provided with a diametric slot forming a longitudinal chamber in the carrier; means for rotating the carrier at a reduced speed from the propeller; ports in the carrier and the bushing for controlling flow of the fluid from the chamber to the outlet-fitting responsive to the rotation of the carrier; the slot in the carrier and the ports in the sleeve coacting responsively to the rotation of the carrier for successively admitting a sample into and trapping the sample in said chamber; a plunger slidable in the slot and rotatable with the carrier; fluid pressure means for imparting strokes to the plunger; and spring-means for retracting the plunger.

9. A sampling device for fluid under pressure in a flow line, comprising: a casing provided with an inlet and an outlet for fluid; a propeller rotatable by fluid in transit through the casing; a sleeve non-rotatively mounted in the case, on which the propeller is journalled, provided with diametrically opposite ports; an outlet-bushing for receiving samples of the fluid from the casing and to which the sleeve is coaxially secured; a cylindrical carrier rotatable and fitting in the bore of the sleeve, provided with a diametric slot forming a longitudinal chamber in the carrier; means for rotating the carrier at a reduced speed from the propeller; the slot in the carrier and the ports in the sleeve coacting responsively to the rotation of the carrier for successively admitting a sample into and trapping the sample in said chamber; the carrier and bushing being provided with means for controlling flow of the fluid from the chamber into the bushing; a plunger slidable in the slot and rotatable with the carrier; fluid pressure means for imparting expelling strokes to the plunger; and means for adjusting the stroke of the plunger and varying the quantity of the sample trapped in the chamber.

10. A sampling device for fluid under pressure in a flow line, comprising: a casing provided with an inlet and an outlet for fluid; a propeller rotatable by fluid in transit through the casing; a sleeve non-rotatively mounted in the case, on which the propeller is journalled, provided with diametrically opposite ports; an outlet-bushing for receiving samples of the fluid from the casing and to which the sleeve is coaxially secured; a cylindrical carrier rotatable and fitting in the bore of the sleeve engaging the bushing and provided with a diametric slot forming a longitudinal chamber in the carrier; spring-means for urging the carrier into engagement with the bushing; means for rotating the carrier at a reduced speed from the propeller; ports in the carrier and the bushing for conducting fluid from the chamber to the outlet-fitting responsive to the rotation of the carrier, the slot in the carrier and the ports in the sleeve coacting responsively to the rotation of the carrier for successively admitting a sample into and trapping the sample in said chamber; a plunger slidable in the slot and rotatable with the carrier; and fluid pressure means for imparting expelling strokes to the plunger.

11. A sampling device for fluid under pressure in a flow line, comprising: a casing provided with an inlet and an outlet for fluid; a propeller including hubs at its ends and vanes between the hubs rotatable by fluid in transit through the casing; a sleeve non-rotatively mounted in the case, on which the hubs of the propeller are journalled, provided with diametrically opposite ports; an outlet-bushing coaxial with and at one end of the sleeve for receiving samples of the fluid from the casing and to which the sleeve is secured; a cylindrical carrier rotatable and fitting in the bore of the sleeve, provided with a diametric slot forming a longitudinal chamber in the carrier; means at the opposite end of and for rotating the carrier at a reduced speed from the propeller; ports in the carrier and bushing for controlling the flow of fluid from the chamber to the outlet-fitting responsive to the rotation of the carrier; the slot in the carrier and the ports in the sleeve coacting responsively to the rotation of the carrier for successively admitting a sample into and trapping the sample in said chamber; a plunger slidable and fitting in the slot and rotatable with the carrier; fluid pressure means for imparting expelling strokes to the plunger; and spring-means for urging the carrier into engagement with the bushing.

12. A sampling device for fluid under pressure in a flow line, comprising: a casing provided with an inlet and an outlet for fluid; a propeller including hubs at its ends and vanes between the hub rotatable by fluid in transit through the casing; a sleeve non-rotatively mounted in the case, on which the hubs of the propeller are journalled, and provided with diametrically opposite ports; an outlet-bushing coaxial with an at one end of the sleeve for receiving samples of the fluid from the casing and to which the sleeve is coaxially secured; a cylindrical carrier rotatable and fitting in the bore of the sleeve, provided with a diametric slot forming a longitudinal chamber in the carrier; means for rotating the carrier at a reduced speed from the propeller; ports in the carrier and the bushing for controlling flow of the fluid from the chamber to the outlet-fitting responsive to the rotation of the carrier; the slot in the carrier and the ports in the sleeve coacting responsively to the rotation of the carrier for successively admitting a sample into and trapping the sample in said chamber; a plunger slidably fitting in and extending diametrically across the slot and rotatable with the carrier; fluid pressure means in the sleeve and the carrier for imparting expelling strokes to the plunger; and spring-means for retracting the plunger.

References Cited in the file of this patent

UNITED STATES PATENTS

| 1,562,121 | Newton | Nov. 17, 1925 |
| 1,691,687 | Watts | Nov. 13, 1928 |
| 1,964,270 | Nidever et al. | June 26, 1934 |
| 2,272,313 | Waters | Feb. 10, 1942 |
| 2,623,544 | Waters et al. | Dec. 30, 1952 |
| 2,740,291 | Brown | Apr. 3, 1956 |